(12) United States Patent  
Keren (10) Patent No.: US 7,681,810 B2  
(45) Date of Patent: Mar. 23, 2010

(54) IRRIGATION EMITTER

(75) Inventor: Ron Keren, D.N. Hanegev (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 12/034,716

(22) Filed: Feb. 21, 2008

(65) Prior Publication Data

US 2009/0212135 A1    Aug. 27, 2009

(51) Int. Cl.  
*B05B 15/00* (2006.01)

(52) U.S. Cl. ............... 239/542; 239/533.1; 239/547; 239/570; 138/42

(58) Field of Classification Search ............... 239/145, 239/533.1, 542, 547, 570; 138/42–46  
See application file for complete search history.

(56) References Cited

U.S. PATENT DOCUMENTS

| | | | |
|---|---|---|---|
| 5,294,058 A * | 3/1994 | Einav | 239/533.1 |
| 5,609,303 A * | 3/1997 | Cohen | 239/542 |
| 5,615,838 A | 4/1997 | Eckstein et al. | |
| 5,636,797 A * | 6/1997 | Cohen | 239/542 |
| 6,027,048 A | 2/2000 | Mehoudar | |
| 6,206,305 B1 * | 3/2001 | Mehoudar | 239/547 |
| 6,250,571 B1 | 6/2001 | Cohen | |
| 6,302,338 B1 * | 10/2001 | Cohen | 239/542 |
| 6,382,530 B1 * | 5/2002 | Perkins | 239/542 |
| 6,581,854 B2 * | 6/2003 | Eckstein et al. | 239/547 |
| 2006/0163388 A1 | 7/2006 | Mari | |
| 2006/0237561 A1 | 10/2006 | Park et al. | |

FOREIGN PATENT DOCUMENTS

| | | |
|---|---|---|
| WO | 98/10635 | 3/1998 |
| WO | 2007/046104 | 4/2007 |
| WO | WO/2008/010026 | 1/2008 |

OTHER PUBLICATIONS

INBAR—flat self-compensating Anti-siphon dripper: downloaded from: http://www.metzerplas.com/dripper/inbar.html, printed on Mar. 6, 2008.  
International Search Report in PCT/IL2009/000189, dated Jun. 5, 2009.  
Written Opinion in PCT/IL2009/000189, dated Jun. 5, 2009.

* cited by examiner

*Primary Examiner*—Steven J Ganey  
(74) *Attorney, Agent, or Firm*—Womble Carlyle (57) ABSTRACT

An emitter comprising: a plurality of inlet apertures through which liquid enters the emitter; a manifold flow channel into which liquid that passes through the apertures flow; an elastic diaphragm that seats on the manifold flow channel; an outlet aperture through which liquid that enters the emitter exits the emitter; wherein liquid that enters the inlet apertures displaces only a portion of the diaphragm from the manifold channel so that the liquid can leave the manifold channel and flow through the emitter to reach the outlet aperture.

16 Claims, 10 Drawing Sheets

IRRIGATION EMITTER

BACKGROUND

Irrigation systems that deliver water, often containing plant nutrients, pesticides and/or medications, to plants via networks of irrigation pipes are very well known. In many such irrigation networks, water from an irrigation pipe is delivered to the plants by "emitters" or "drippers", hereinafter generically referred to as emitters, which are connected to or installed along the length of the pipe. Each emitter comprises at least one inlet or an array of inlets through which water flowing in the pipe enters the emitter and an outlet through which water that enters the emitter exits the emitter. The emitter diverts a relatively small portion of water flowing in the pipe and discharges the diverted water to irrigate plants in a neighborhood of the location of the emitter.

Generally, to control rate of water discharge by the emitter, the emitter comprises an elastic diaphragm and/or a water flow and pressure reduction channel, a "labyrinth channel" or "labyrinth" through which water that enters the emitter must flow to reach the emitter outlet. The labyrinth channel is a high resistance flow channel along which pressure of water flowing through the emitter drops relatively rapidly with distance along the labyrinth channel. The pressure drop from a relatively high water pressure at the emitter inlet, to a relatively low discharge pressure, generally a gauge pressure equal to about zero, substantially at or near the emitter outlet. The labyrinth channel generally comprises a tortuous "obstacle" flow path that generates turbulence in water flowing in the labyrinth to reduce water pressure and discharge of water by the emitter. Usually, the obstacle path comprises a configuration of baffles that impede and introduce turbulence into water flow.

The elastic diaphragm operates to control liquid flow so that it is substantially independent of inlet pressure for a range of pressures typically encountered in irrigation applications and is equal to a flow rate between about 0.5 and 12 liters per hour (l/h). The diaphragm is usually seated on a support shelf and is located between the inlet and the outlet and constrains water that enters the emitter inlet to pass through the labyrinth to reach the emitter outlet and flow out of the emitter. The diaphragm is responsive to pressure of the entering water, and as pressure of the entering water increases, the diaphragm undergoes increasing distortion. The distortion operates to increase resistance to liquid flow through the dripper with increase in distortion. In some emitters, the distortion increases resistance to water flow through the emitter with increase in inlet pressure by increasing a length of the labyrinth through which liquid is constrained to flow to reach the outlet. Some emitters are formed having an outlet reservoir into which water that flows through the labyrinth empties, and from which water exits the emitter and additionally or alternatively, the increase in resistance may be accomplished by changing a dimension of an outlet reservoir to increase resistance of liquid in the outlet reservoir to exit the reservoir.

An emitter having a flow regulated so that it is substantially independent of inlet liquid pressure is referred to as a regulated emitter.

Labyrinths and various other liquid flow channels in emitters have a tendency to become blocked by particulate matter, such as dirt, debris or agglomerations of plant nutrients that may be carried by liquid that flows through the emitter during plant irrigation from irrigation pipes in which the emitters are mounted. In addition, emitter outlets and flow channels have a tendency to get clogged with dirt and debris that are sucked back into the emitters by water and/or air backflow. Water and/or air backflow typically occurs when supply of water to irrigation pipes providing water to plants in a field or hothouse is turned off and pressure in the pipes falls. For subsurface drip irrigation (SDI) pipes, which are buried in the ground or a growing medium, particulate matter in the surrounding soil or growing medium tends to be drawn into and clog emitters in the pipes when water pressure in the pipes falls. For above surface drip irrigation, backflow tends to clog emitters by drawing into the emitters particulate matter in mud and dust in environments in which the emitters often are located.

To reduce a probability of particulate matter carried by liquid flowing in irrigation pipes from entering and clogging emitters mounted in the pipes, emitters are generally designed having various types of inlet filtering configurations. The inlet filters tend to prevent particulate matter greater than a given size that may be carried by irrigation liquids in the pipes from entering the emitters. Internal liquid flow channels of the emitters are formed sufficiently large so that particulate characterized by a size less than the given size that are passed by the filters do not clog the channels. To reduce a probability that dirt and debris is sucked back into emitters when water pressure is reduced in the pipes emitters have been designed to seal themselves against back flow when pressure in an irrigation pipe in which they are installed is reduced. Such drippers, commonly referred to as "anti-siphon" or "non-return" emitters, are usually configured having an elastic diaphragm that sets on and seals an inlet orifice of the emitter.

U.S. Pat. No. 6,027,048, the disclosure of which is incorporated herein by reference, describes a regulated non-return agricultural emitter comprising a filter configuration, a labyrinth, and an elastic diaphragm that seals the emitter against "backflow". The inlet configuration comprises two relatively long inlet channels that "are relatively larger in width than those of conventional emitter units". Each inlet channel has an array of "filter baffles" along its length and is "undercut" in an outside surface of the emitter so that it is partially covered with a lip that runs along the length of the channel. The baffles and lip operate to prevent particulate matter in liquid carried by an irrigation pipe in which the emitter is installed and that might clog the emitter from entering the inlet channel. The two inlet channels communicate via a coupling channel to a "single restricted inlet" through which liquid from the irrigation pipe in the inlet channels enters the emitter. An elastic diaphragm operates to regulate liquid flow through the emitter. To provide a non-return function, the diaphragm seals the single restricted inlet when water pressure in the irrigation pipe is reduced below a desired threshold pressure.

The patent notes that the use of "inflow paths which are relatively larger in width than those of conventional emitter units" aids in "minimizing the dangers of blockage", and are "of particular significance where, as in the emitter unit specifically described and illustrated, a non-return valve construction is provided for. With such a construction, only a single restricted inlet . . . into the emitter unit is available, and such a restricted inlet could not accommodate adequate filtering means."

U.S. Pat. No. 5,615,838, the disclosure of which is incorporated herein by reference, describes integrated emitters, referred to as in-line emitters, that have a non-return feature and optionally provides a regulated flow of water. In an embodiment of the invention, a flexible membrane closes the emitter to flow into or out of the emitter when inlet pressure to the emitter falls below a minimum pressure. The membrane optionally functions to control a length of a labyrinth through which water flows responsive to inlet pressure to regulate flow of water provided by the emitter.

SUMMARY

An aspect of some embodiments of the invention relates to providing a regulated non-return emitter suitable for mounting inside an irrigation pipe and comprising a relatively simple configuration.

An aspect of some embodiments of the invention, relates to providing the emitter with a relatively simple filtering configuration.

In an embodiment of the invention, the emitter comprises a relatively long manifold flow channel formed on an internal surface of the emitter. The manifold communicates with a plurality of inlets through which liquid from an irrigation pipe comprising the emitter enters into the manifold and the emitter.

An elastic diaphragm seats on the manifold channel and constrains liquid that enters the manifold via the inlets to flow through a labyrinth before debauching into an outlet reservoir from which the liquid exits the emitter.

According to an aspect of some embodiments of the invention, the manifold channel comprises a raised rim on which the diaphragm seats to seal at least a portion of the channel and constrain thereby the liquid to flow through the labyrinth.

According to an aspect of some embodiments of the invention, an array of protuberances, hereinafter referred to as "registration buttons", on the internal emitter surface on which the manifold channel is formed, position the diaphragm so that it seats on the labyrinth and forms a wall of the labyrinth.

In an embodiment of the invention, the diaphragm deforms responsive to inlet pressure of liquid that enters the inlets to regulate liquid flow through the emitter by changing dimensions of the outlet reservoir.

There is therefore provided in accordance with an embodiment of the invention an emitter comprising: a plurality of inlet apertures through which liquid enters the emitter; a manifold flow channel into which liquid that passes through the apertures flow; an elastic diaphragm that seats on the manifold flow channel; an outlet aperture through which liquid that enters the emitter exits the emitter; wherein liquid that enters the inlet apertures displaces only a portion of the diaphragm from the manifold channel so that the liquid can leave the manifold channel and flow through the emitter to reach the outlet aperture.

Optionally, the emitter comprises a labyrinth that receives liquid that has flowed in the manifold channel. Optionally, the emitter comprises a regulation reservoir that receives liquid that flows through the labyrinth. Optionally, the emitter is configured so that displacement of the diaphragm decreases volume of the regulation reservoir.

In some embodiments of the invention, the diaphragm seats on the labyrinth to constrain liquid to flow through the labyrinth.

In some embodiments of the invention, the emitter comprises first and second parts that sandwich the diaphragm between them. Optionally, the first part is formed having the manifold channel. Optionally, the emitter has a feed flow channel formed in the first part that receives liquid that exits the manifold channel and directs flow of the received liquid in a direction to enter the labyrinth. Optionally, the diaphragm covers a first portion of the feed flow channel leaving a second portion uncovered. Optionally, the received liquid exits the feed flow channel via the second portion of the feed flow channel to enter the labyrinth. Optionally, when the diaphragm is displaced from the manifold channel, it is displaced from at least a portion of the first portion of the feed flow channel.

In some embodiments of the invention, the first part is formed having a plurality of protuberances on which the diaphragm rests. Optionally, when the diaphragm is displaced from the manifold channel some of the liquid that exits the manifold channel flows between protuberances to reach the feed flow channel.

In some embodiments of the invention, the second part is formed having the labyrinth.

In some embodiments of the invention, the second part is formed having the reservoir chamber.

There is further provided in accordance with an embodiment of the invention, an emitter comprising: a first part having formed therein a manifold flow channel having first and second regions; a second part having formed therein a labyrinth; and an elastic diaphragm sandwiched between the first and second parts so that the diaphragm is maintained pressed by the second part to the first region of the manifold flow channel. Optionally, liquid enters the manifold flow channel via a plurality of apertures. Optionally, the second part is formed having a regulation reservoir, and wherein the diaphragm is located between the reservoir and the second region of the manifold flow channel.

BRIEF DESCRIPTION OF FIGURES

Non-limiting examples of embodiments of the present invention are described below with reference to figures attached hereto. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1A:
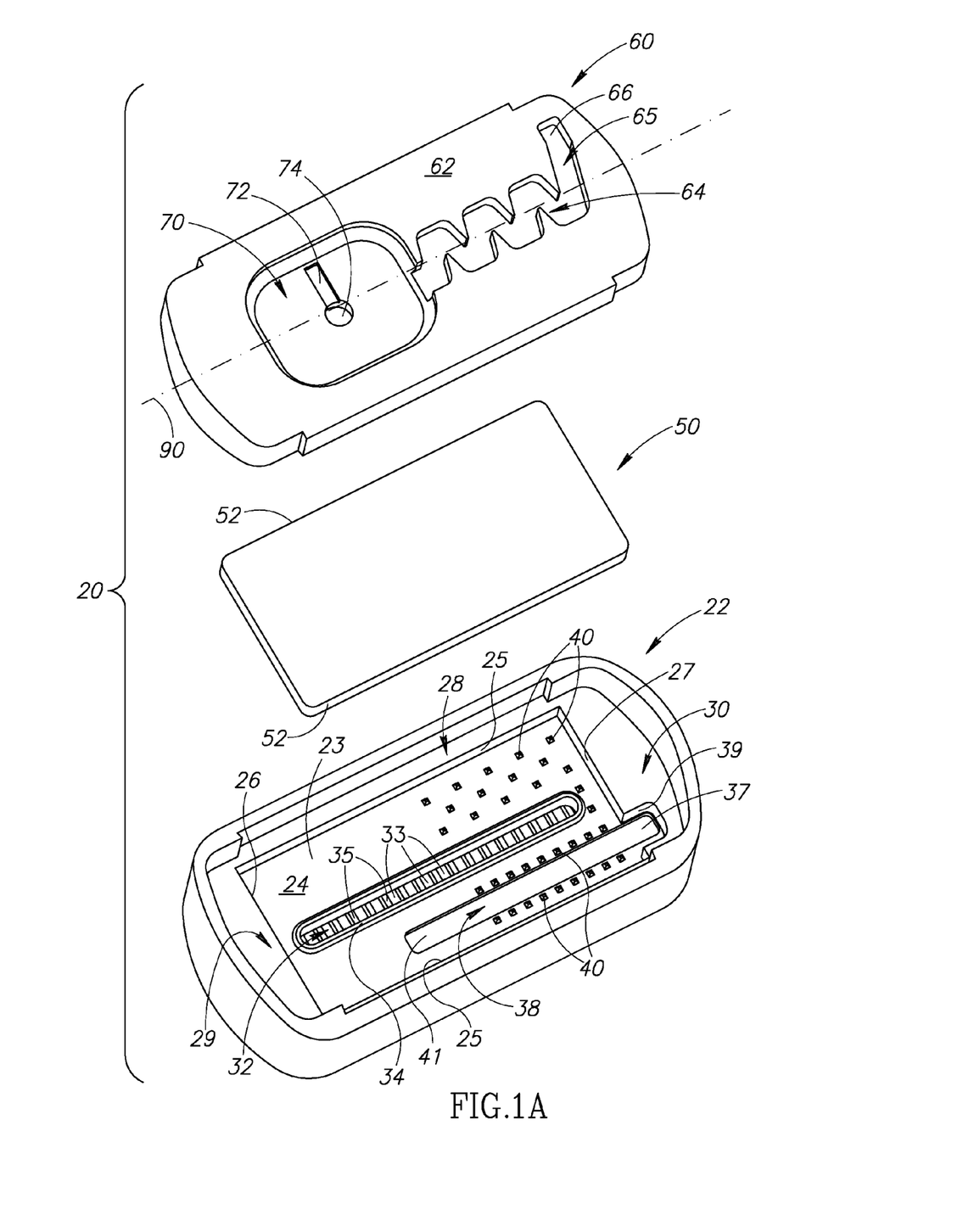
FIG. 1A shows a schematic exploded view of a regulated non-return emitter comprising an emitter housing, an elastic diaphragm, and a housing insert (rotated out of position for convenience of presentation), in accordance with an embodiment of the invention.

FIG. 1A shows a schematic, exploded, perspective view of an emitter 20 configured to be inserted inside an irrigation pipe, divert liquid flowing in the pipe and emit the diverted liquid from the pipe to irrigate plants, in accordance with an embodiment of the invention. Emitter 20 optionally comprises a housing 22, an elastic diaphragm 50 and a housing insert 60. In the perspective of FIG. 1, internal features and surfaces of housing 22 and housing insert 50 are shown.

Housing 22 is formed having an optionally rectangular diaphragm recess 23 defined by a bottom internal surface 24, relatively long, optionally mirror image, edge surfaces 25, and relatively short edge surfaces 26 and 27. Long edge surfaces 25 are surfaces of, optionally mirror image, side support shelves 28. Short edge surfaces 26 and 27 are surfaces of end support shelves 29 and 30 respectively.

Figure 1B:
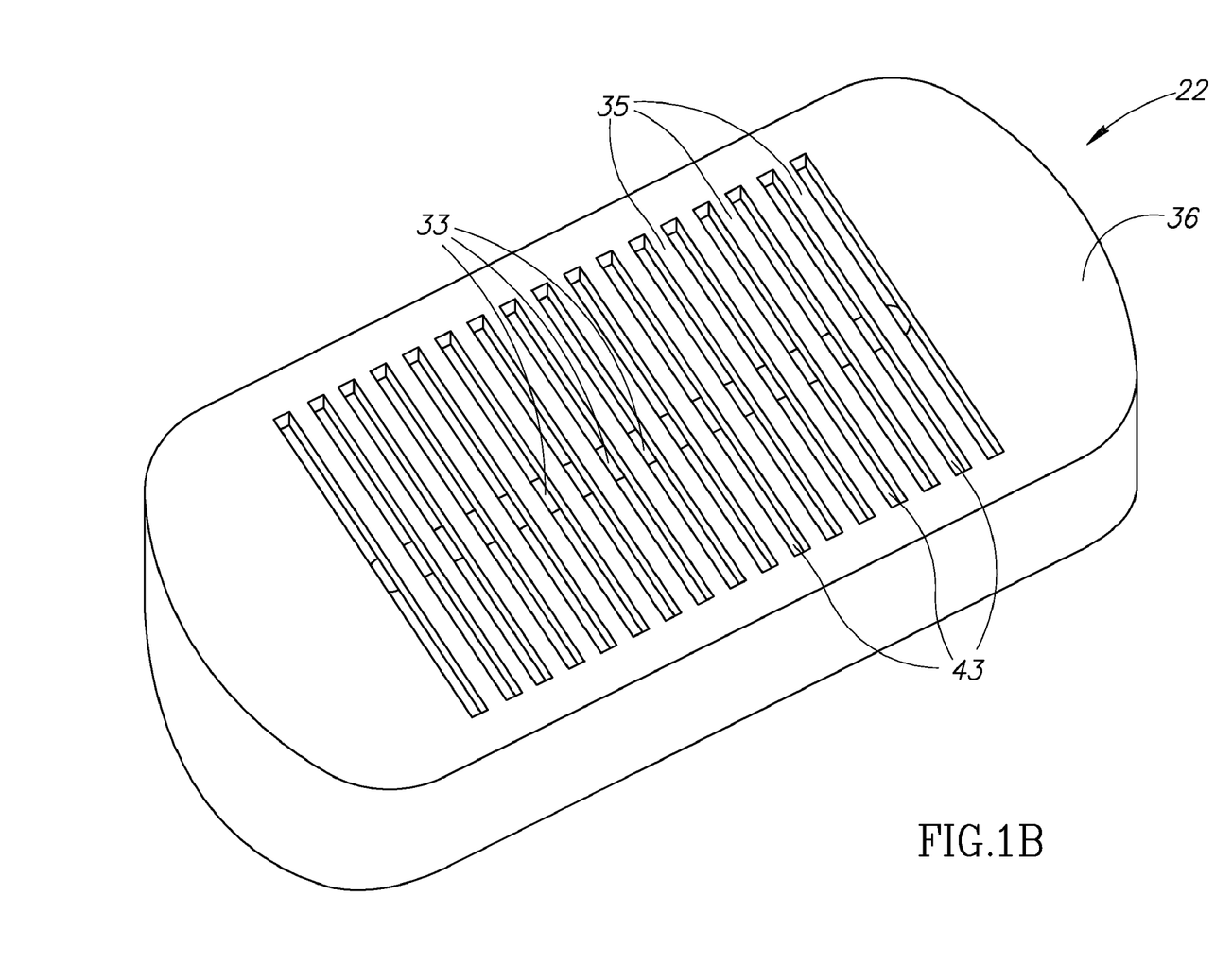
FIG. 1B, shows a schematic perspective view of the emitter housing shown in FIG. 1A from a direction opposite that from which the housing is shown in FIG. 1A, in accordance with an embodiment of the invention.

Bottom internal surface 24 is formed having an optionally straight manifold flow channel 32 that communicates with a linear array of distinct inlet apertures 33 though each of which liquid flowing in an irrigation pipe in which the emitter is mounted may separately enter the emitter. Each distinct inlet aperture 33 thus defines a separate fluid flow path between an external surface 36 of the emitter and the manifold flow channel 32 which is arranged such that all liquid passing through the emitter must pass through the manifold flow channel 32. The manifold channel is rimmed with a raised rim 34 which rises above the bottom internal surface 24. Each inlet aperture 33 is characterized by a size that tends to prevent particulate matter that may clog the emitter flow channels from entering the emitter. The inlet apertures are, optionally, formed by a plurality of parallel ribs 35 that are optionally substantially perpendicular to the length of manifold flow channel 32 and separated by, optionally equal width, spaces 43. The ribs depend towards manifold flow channel 32 from an external surface 36 of housing 22 shown in a FIG. 1B. FIG. 1B, schematically shows a perspective view of housing 22 from a direction opposite that from which housing 22 is shown in FIG. 1A. Spaces 43 t between the ribs intersect manifold flow channel 32. The size of each inlet aperture 33 is defined by a space 43 between ribs 35 and the width of manifold flow channel 32, i.e., the inlet aperture size is substantially equal to a projection of the space between two adjacent ribs 35 on a space defined by the width of the manifold flow channel. In accordance with an embodiment of the invention, the width of manifold channel 32 is larger than the width of each space 43 so that particulate matter that may pass through a space 43, in general would not clog the manifold flow channels.

Bottom surface 24 (FIG. 1A) is also optionally formed having a linear feed flow channel 38 that is optionally parallel to manifold inlet channel 32. Feed flow channel 38 extends in a direction towards end shelf 30 from a region 41 alongside a manifold channel 32 to beyond the manifold channel 32 and into cranny 39 formed in the end shelf. An array of registration buttons 40, configured as protuberances, each spaced apart from the manifold flow channel 32, surrounds manifold and feed channels 32 and 38 in a portion of bottom surface near end shelf 30. Registration button 40 and manifold rim 34 rise about bottom surface to about a same height.

Figure 1C:
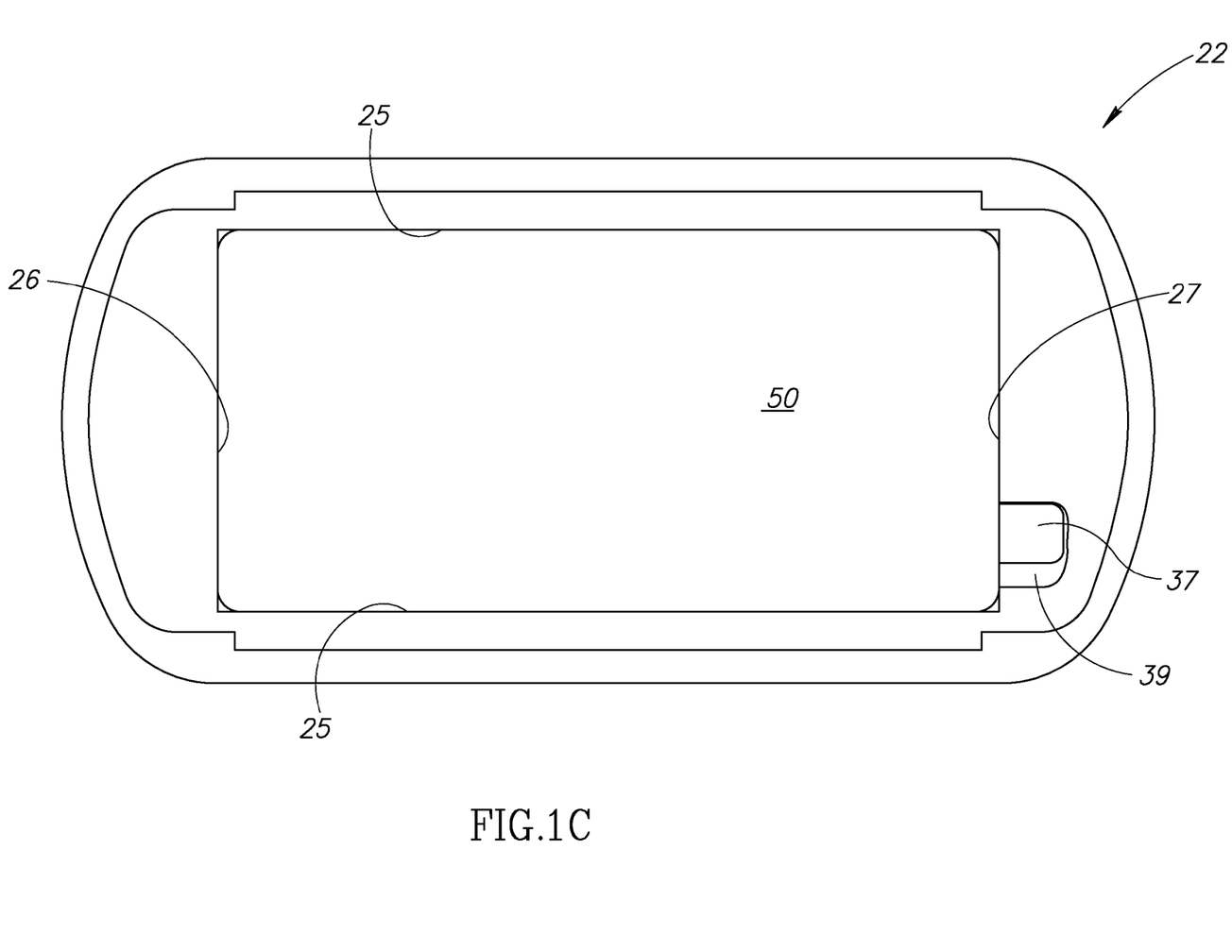
FIG. 1C schematically shows the diaphragm shown in FIG. 1A seated in the emitter housing, in accordance with an embodiment of the invention.

Elastic diaphragm 50 is shaped to seat in diaphragm recess 23 of housing 22 and has a rectangular shape with long edges 52. When seated in the diaphragm recess, the diaphragm is framed by long edge surfaces 25 and short edge surfaces 26, and 27. FIG. 1C schematically shows diaphragm 50 seated in diaphragm recess 23 (FIG. 1A).

It is noted that when diaphragm 50 is positioned in the diaphragm recess, the diaphragm covers features on bottom surface 24 except for a portion 37 of feed flow channel 38 that is located in cranny 39. Portion 37 of the feed flow channel in the cranny is hereinafter referred to as a feed channel outlet port 37.

Housing insert 60 has an inside surface 62 and is shaped to be inserted into housing 22 so that portions of the inside surface seat on support shelves 28, 29 and 30. Inside surface 62 of housing insert 60 is formed having a labyrinth 64 that empties into an internal "regulation reservoir" 70 and is connected to a labyrinth inlet channel 65 having a labyrinth inlet port 66. Labyrinth 64 may be any suitable labyrinth known in the art and is optionally a labyrinth similar to a labyrinth described in PCT Patent Application IB2006/052473, the disclosure of which is incorporated herein by reference. Regulation reservoir 70 is formed having a "trickle channel" 72 and a regulation reservoir outlet channel 74 discussed below.

Housing insert 60 is flipped 180° about an axis 90 relative to its orientation in FIG. 1A to be inserted into housing 22. When the housing insert 60 is properly inserted into housing 22, the insert is supported by support shelves 28, 29 and 30 and labyrinth inlet port 66 (FIG. 1A) of the insert is located over cranny 39 and feed channel outlet port 37 (FIG. 1A and FIG. 1C) of housing 22. To secure housing insert 60 in the housing, any of various methods and or materials known in the art may be used. For example, insert 60 may be bonded in housing 22 by ultrasonic welding or by gluing.

With housing insert 60 securely in place in housing 22, diaphragm 50 is sandwiched between the insert and the housing, pressing firmly on inside surface 62 of insert 60 and rim 34 and registration buttons 40 on bottom internal surface 24 of housing 22. By being pressed snugly to inside surface 62 of insert 60 the diaphragm provides a top wall for labyrinth 64 that substantially seals the labyrinth against leakage of liquid where the diaphragm covers the labyrinth.

Figure 1D:
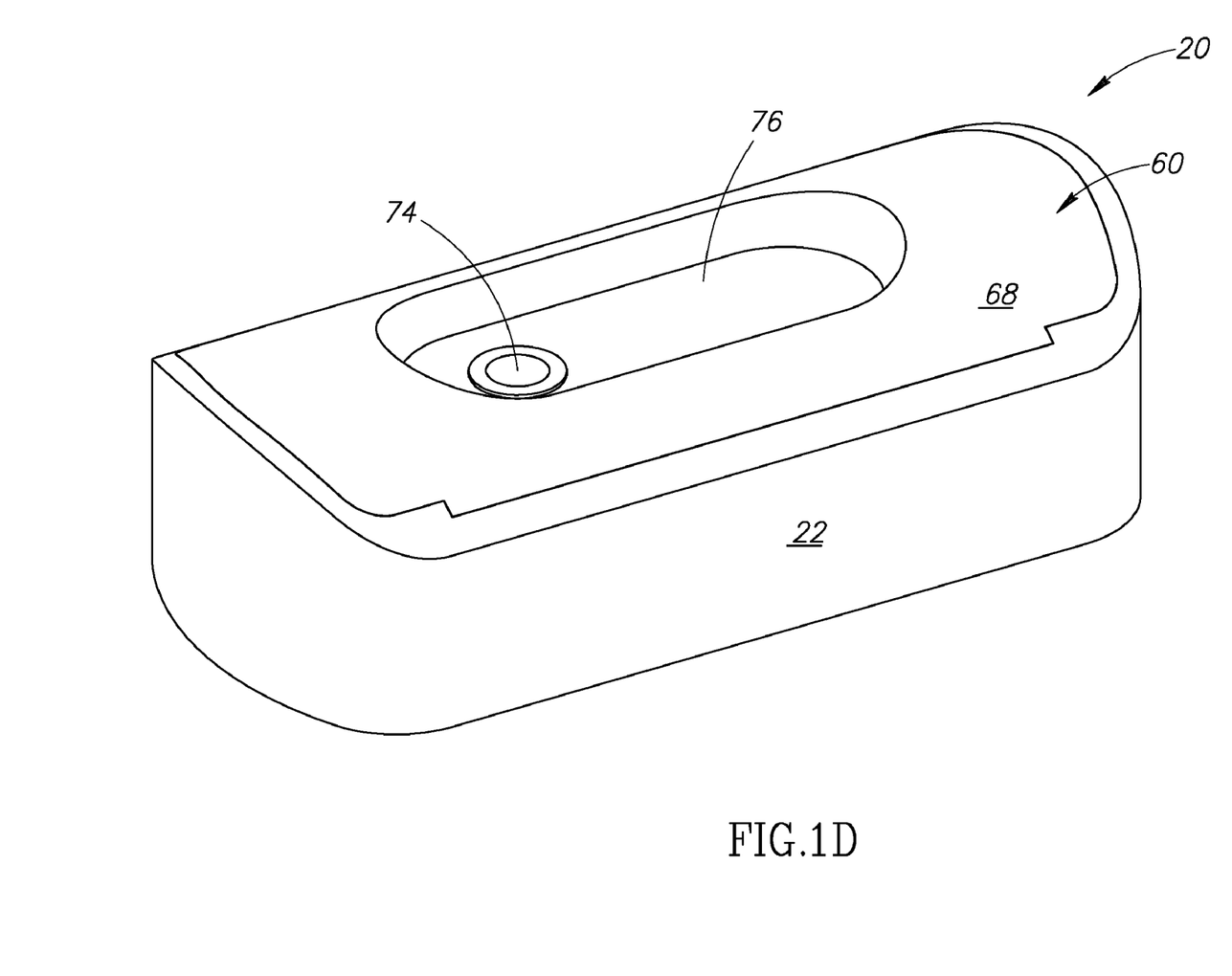
FIG. 1D schematically shows a perspective view of the emitter shown in FIG. 1A completely assembled, in accordance with an embodiment of the invention.

FIG. 1D schematically shows a perspective view of emitter 20 completely assembled with insert 60 flipped and seated in housing 22. In the perspective of FIG. 1D, an outside top surface 68 of housing insert 60 is shown. The top surface is optionally curved to match a curvature of an irrigation pipe in which emitter 20 is intended to be installed so that it may be bonded to an inside surface of the pipe. Top surface 68 is optionally formed having an outside liquid reservoir 76 that communicates with regulation reservoir 70 (FIG. 1A) via regulation reservoir outlet channel 74. Liquid exits an irrigation pipe in which emitter 20 is installed from outside liquid reservoir 76.

Figure 2A:
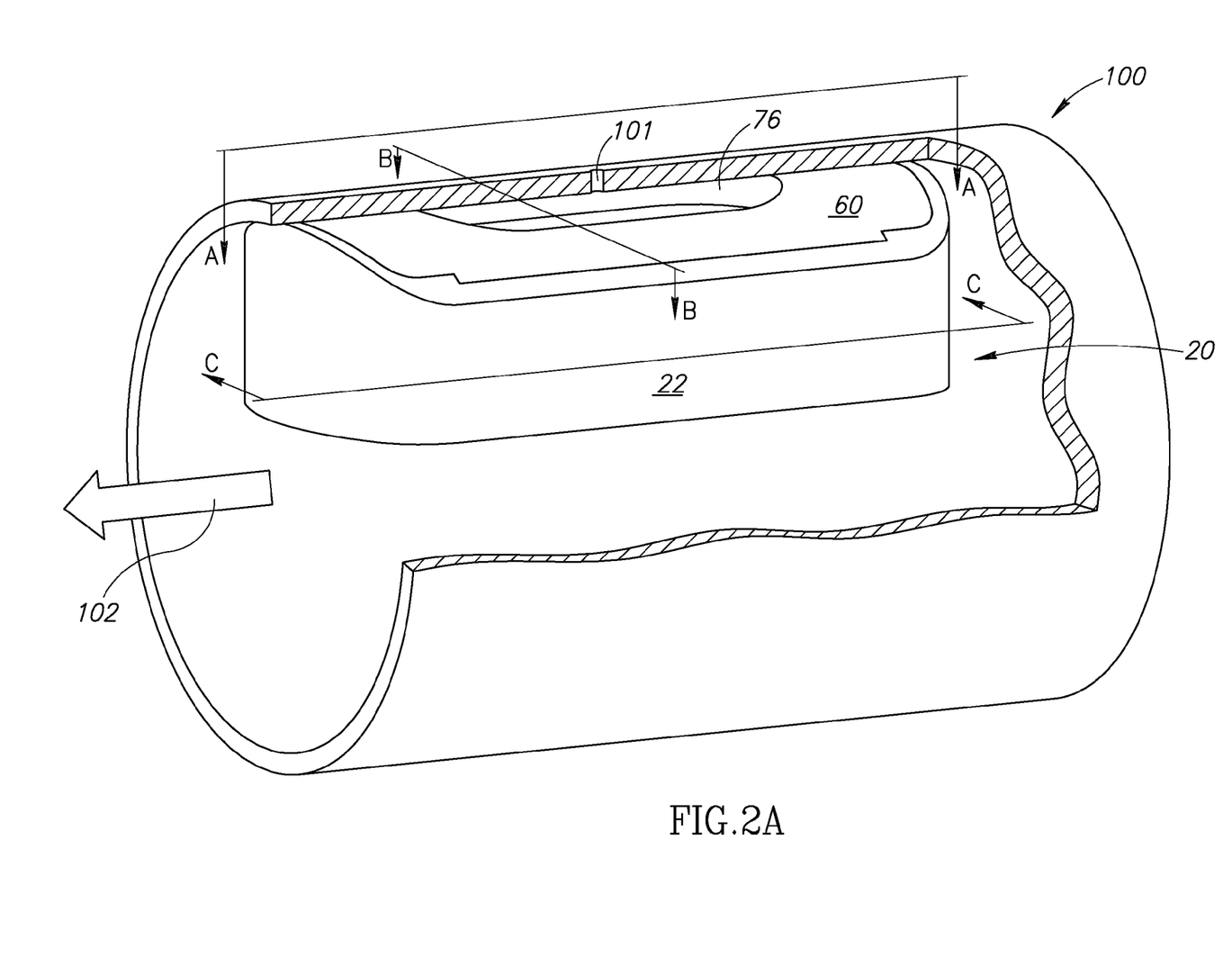
FIG. 2A schematically shows the assembled emitter shown in FIG. 1D mounted in an irrigation pipe in accordance with an embodiment of the invention.

FIGS. 2A-2E schematically illustrate operation of emitter 20 when mounted in an irrigation pipe 100 in which liquid, indicated by a block arrow 102 for irrigating plants is flowing, in accordance with an embodiment of the invention. FIG. 2A schematically shows the irrigation pipe partially cutaway to show the emitter mounted therein.

Figure 2B:
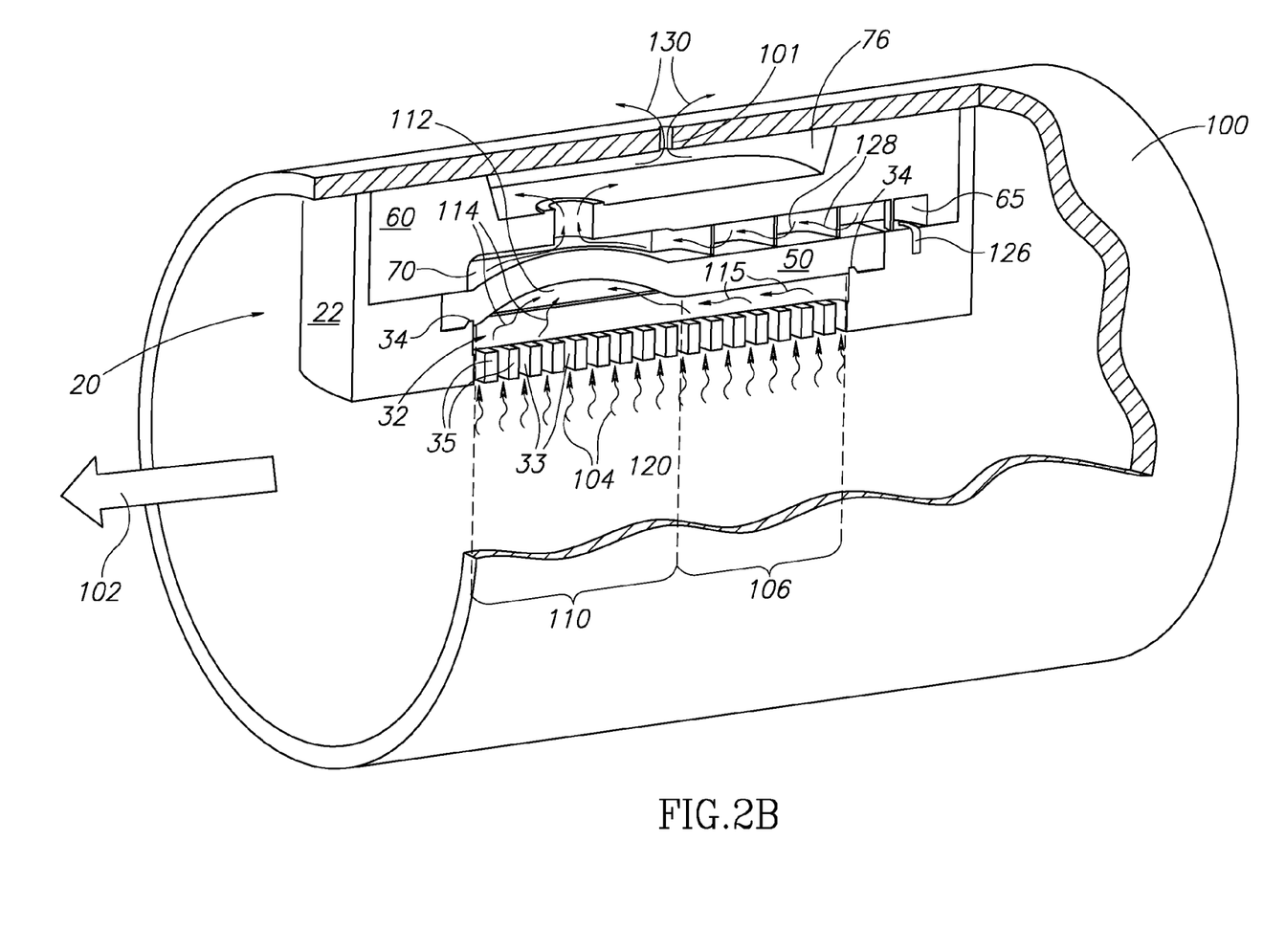
FIG. 2B schematically shows a view of the emitter in FIG. 2A cutaway to show flow patterns of liquid in the emitter, in accordance with an embodiment of the invention.

In FIG. 2B emitter 20 is cutaway to show a cross section of the emitter in a plane AA indicated in FIG. 2A. Plane AA bisects emitter 20 along the length of manifold flow channel 32. A portion, indicated by wavy arrows 104, of liquid 102 flowing in irrigation pipe 100 is diverted into emitter 20 and flows into manifold flow channel 32 through spaces 43 between ribs 35, which define inlet apertures 33 of the emitter. Liquid 104 that enters manifold flow channel 32 is substantially prevented from exiting the manifold channel in a first region, indicated by a bracket 106, of the channel opposite labyrinth 64 because in that first region insert 60 presses diaphragm 50 snuggly onto rim 34 of the manifold channel thereby sealing the channel in that region against egress of liquid.

However, in a second region, indicated by a bracket 110, of manifold channel 32, opposite regulation reservoir 70, diaphragm 50 is not constrained to remain pressed against rim 34. As a result, in second region 110 of manifold channel 32, when pressure of liquid 104 that enters the manifold channel exceeds a predetermined threshold pressure, the pressure pushes diaphragm 50 off of rim 34 of the manifold channel. The threshold pressure is determined, inter alia, by properties of material from which diaphragm 50 is produced, dimensions of the diaphragm, dimensions of the rim 34 and dimension of regulation reservoir 70. Diaphragm 50 and regulation reservoir 70 may be configured using any of various methods and materials known in the art to provide a desired threshold pressure. Optionally, the threshold pressure is substantially zero.

As diaphragm 50 is lifted off rim 34, liquid 104 flows out of second region 110 of channel 32 filling a space 112 that its pressure creates between the diaphragm and housing 22. The flow of liquid out of the manifold channel 32 in second region 110 is schematically represented in FIG. 2B by arrows 114 and generates a flow of liquid indicated by wavy arrows 115 in the manifold channel towards second region 110. Liquid 114 that flows out of manifold channel 32 exits the manifold channel under diaphragm 50 to flow in substantially all directions in space 112 between diaphragm 50 and bottom surface 24 of housing 22, eventually to flow into feed flow channel 38. Optionally, space 112 overlies at least region 41 (FIG. 1A) of feed flow channel 38 as shown in a FIG. 2C.

Figure 2C:
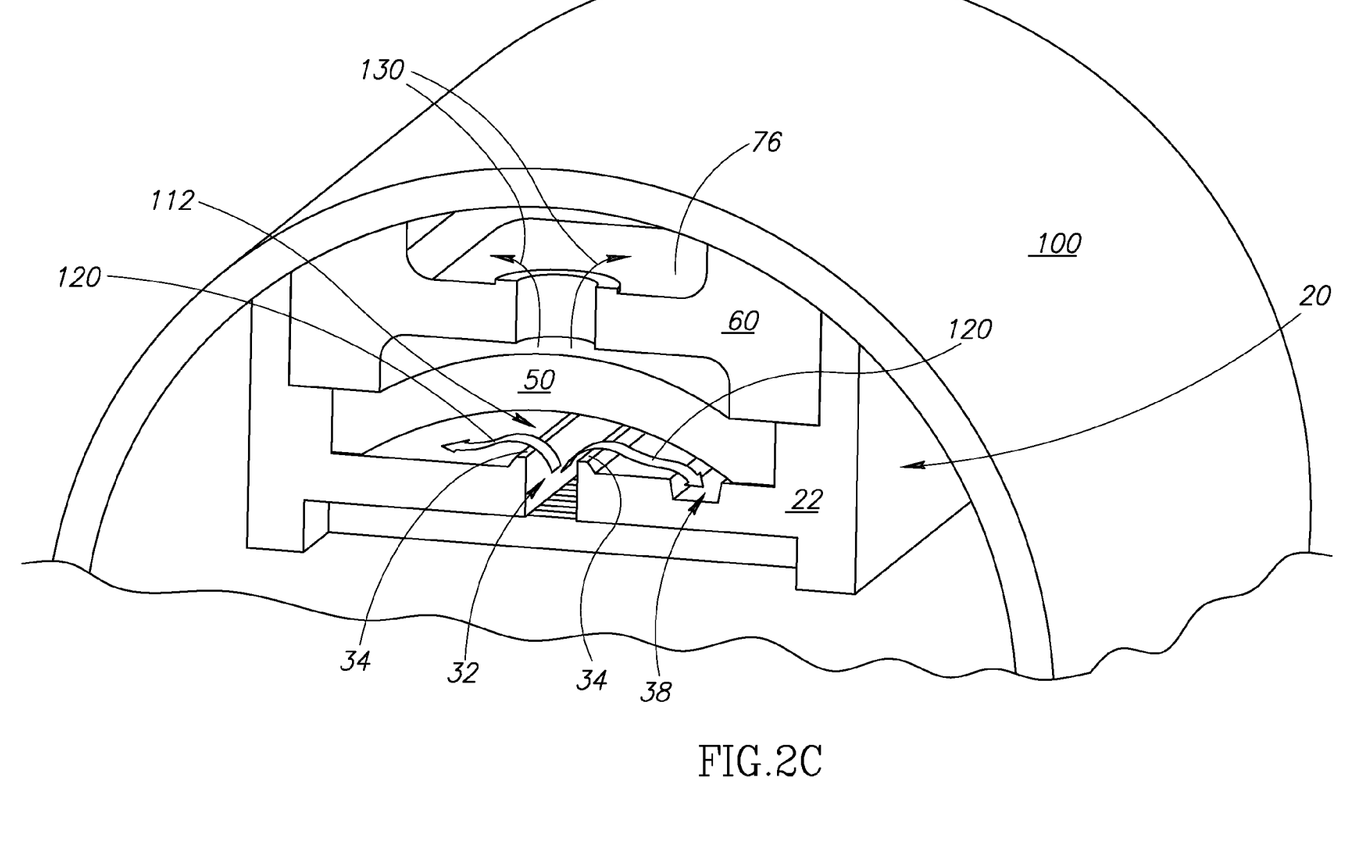
FIG. 2C schematically shows another view of the emitter in FIG. 2A cutaway to show flow patterns of liquid in the emitter, in accordance with an embodiment of the invention.
Figure 2D:
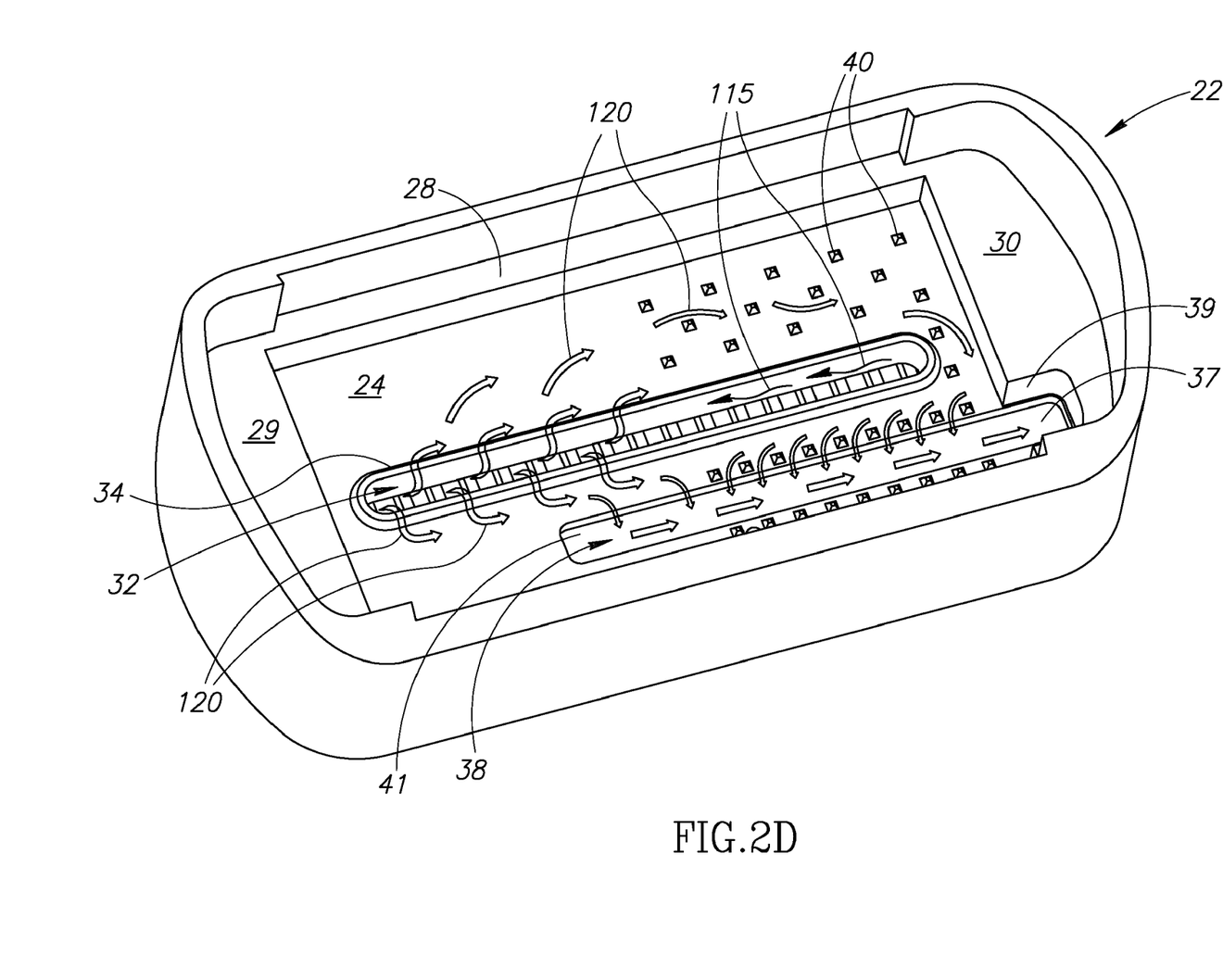
FIG. 2D schematically shows the emitter housing shown in FIG. 1A and flow patterns of liquid along a bottom surface of the emitter, in accordance with an embodiment of the invention.

FIG. 2C schematically shows a cross section of emitter 20 along a plane BB indicated in FIG. 2A in which diaphragm 50 is lifted off rim 34 by pressure of liquid 104 (FIG. 2B) flowing into emitter 20 and liquid flowing out of manifold channel 32 enters feed flow channel 38. In FIG. 2C, and in FIG. 2D that follows, liquid flowing towards feed flow channel 38 from space 112 is schematically represented by block arrows 120. FIG. 2D schematically shows housing 22 and bottom internal surface 24 of the housing, and in the figure, arrows 120 schematically indicate flow of liquid from manifold channel 32 to feed flow channel 38 by various flow routes. As indicated in FIG. 2D, some of the flow routes to feed flow channel 38 pass around registration buttons 40.

Liquid that enters feed flow channel 38 flows along the feed flow channel to feed flow outlet port 37 (FIGS. 1A, 1C, 2D) from where it exits the feed flow channel. The exiting fluid flows upwards from the outlet port along cranny 39 (FIGS. 1A, 1C, 2D) to flow into labyrinth inlet channel 65 via labyrinth inlet port 66 (FIGS. 1A, 2B) and therefrom into labyrinth 64. In FIG. 2B fluid flowing upwards from outlet port 37 along cranny 39 and into inlet port 66 is schematically represented by a block arrow 126. Liquid that flows into labyrinth 64 wends it way through the labyrinth to enter regulation reservoir 70. Arrows 128 in FIG. 2B schematically represent liquid flowing through the labyrinth and into regulation reservoir 70.

Figure 2E:
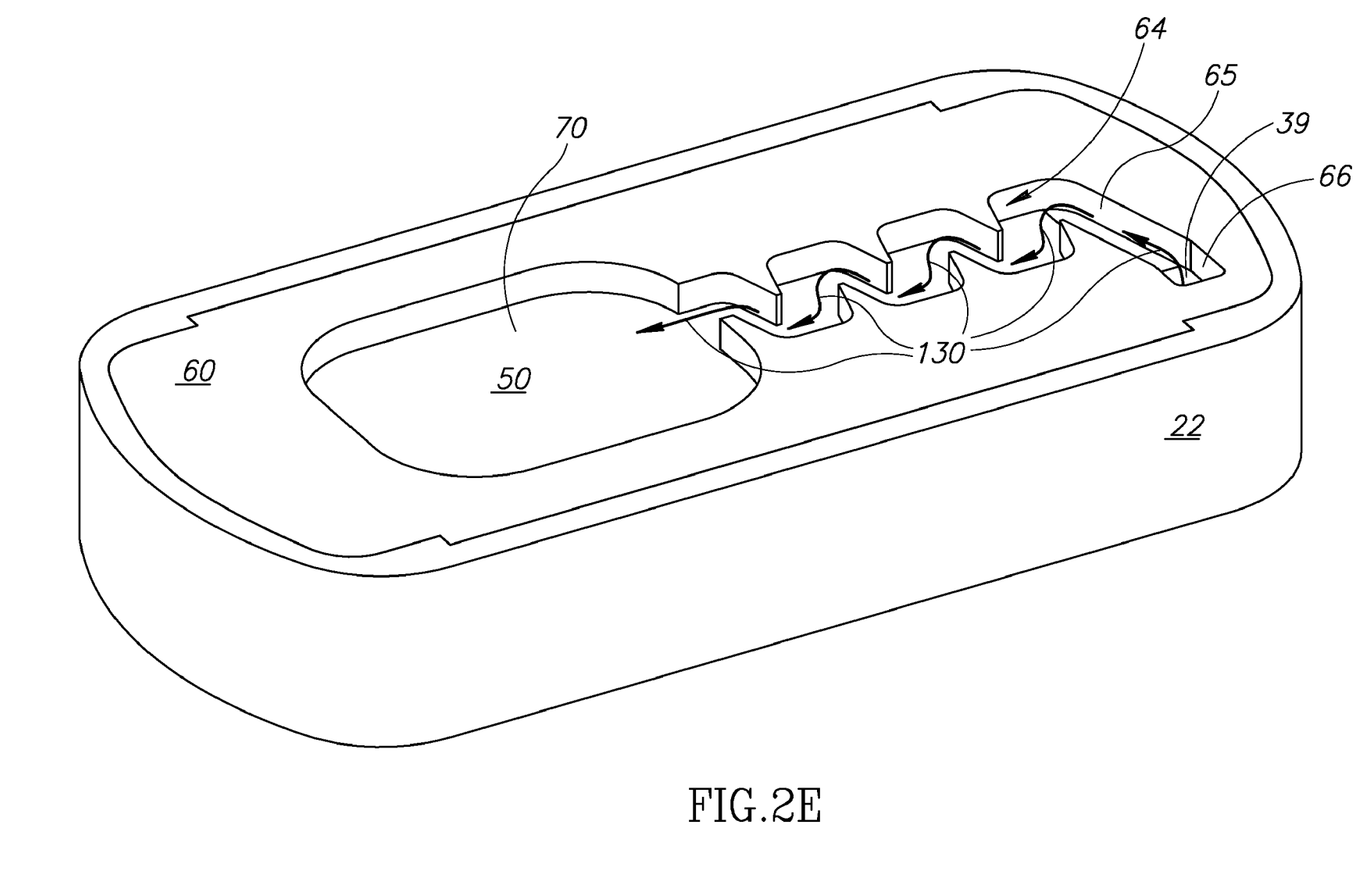
FIG. 2E schematically shows a view of the emitter cutaway to show flow of liquid through a labyrinth of the emitter, in accordance with an embodiment of the invention.

Details of liquid flow into and through labyrinth 64, in accordance with an embodiment of the invention are shown in FIG. 2E. The figure schematically shows a cross section of emitter 20 along a plane CC indicated in FIG. 2A showing labyrinth 64, labyrinth inlet channel 65 and its inlet port 66. Liquid, indicated by arrows 130, from feed flow channel 38 (FIG. 2C, FIG. 2D) flows upwards along cranny 39 (FIGS. 1A, 1C) of housing 22 to labyrinth inlet port 66 and enters labyrinth inlet channel 65. Liquid 130 then flows into labyrinth inlet channel 64 and meanders its way through the labyrinth to debauch into regulation reservoir 70. From the regulation reservoir the liquid flows into outlet reservoir 76 shown in FIGS. 2A-2C and exits irrigation pipe 100 via orifice 101.

Resistance to flow of liquid into regulation reservoir 70 from the labyrinth and from the regulation reservoir into outlet reservoir 76 is a function of displacement of diaphragm 50 away from bottom internal surface 24 of housing 22 and into the regulation reservoir and increases with the displacement. The displacement in turn is a function of inlet pressure of liquid entering emitter 20 that operates to lift the diaphragm off rim 34 and into the regulation reservoir and increases with increasing pressure. By suitably determining dimensions of regulation reservoir 70 and elasticity and thickness of diaphragm 50, resistance to liquid flow through regulation reservoir 70 is determined, in accordance with an embodiment of the invention, to increase substantially linearly with increase in inlet pressure. As a result, the diaphragm operates to regulate flow of liquid from irrigation pipe 100 through emitter 20 and flow rate of liquid from the irrigation pipe that passes through emitter 20 and exits the irrigation pipe is substantially independent of inlet pressure. Trickle channel 72 (FIG. 1A) functions to maintain liquid flow through emitter 20 for inlet pressures that are so large that diaphragm 50 is pressed against reservoir outlet channel 74 and would in the absence of the trickle chamber seal the outlet channel.

Figure 2F:
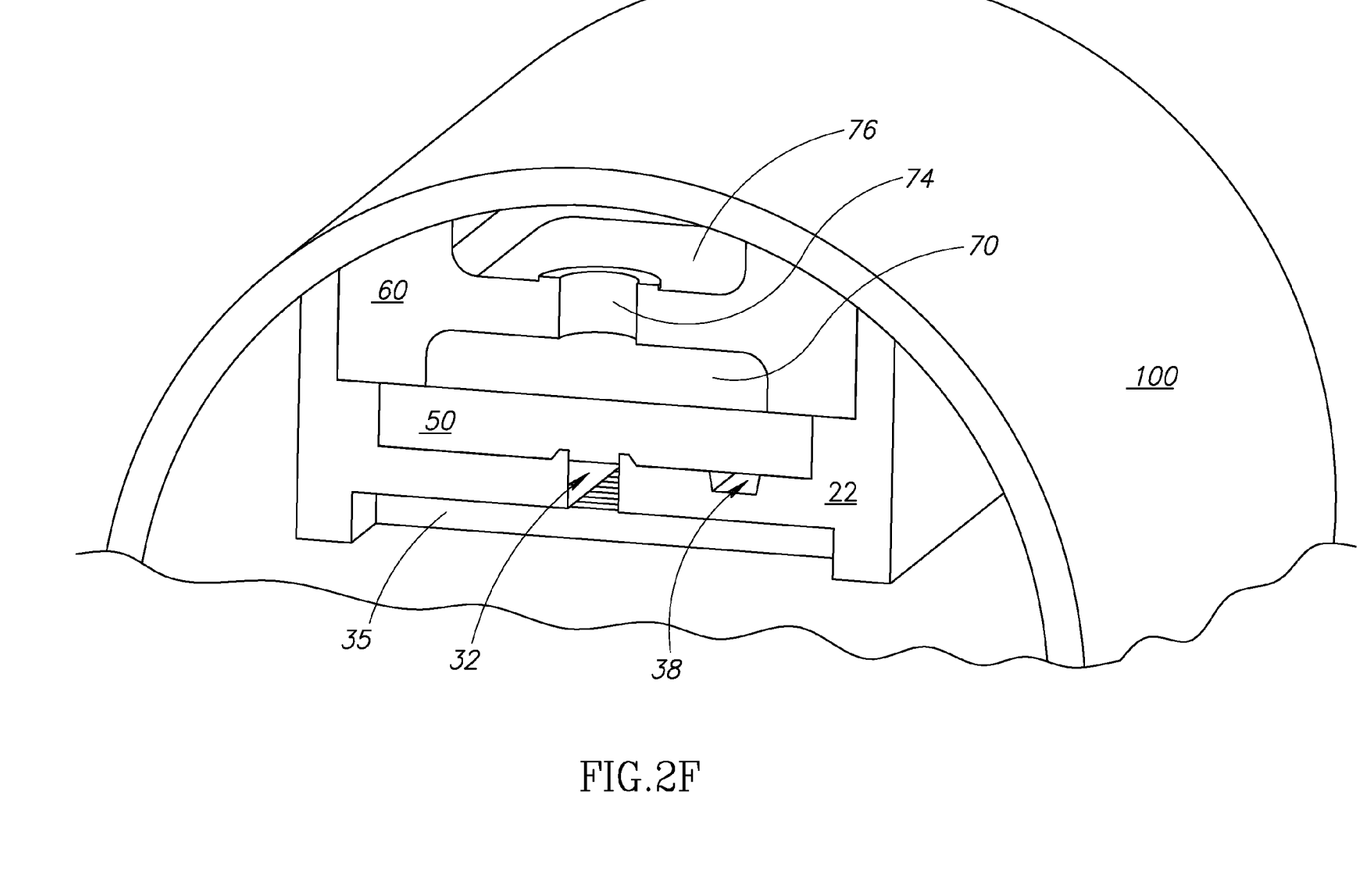
FIG. 2F schematically shows a view of the emitter cutaway to show the elastic diaphragm shown in FIG. 1A sealing the emitter against backflow, in accordance with an embodiment of the invention.

Diaphragm 50 also operates to seal emitter 20 against backflow of liquid into emitter 20 and when liquid pressure in irrigation pipe 100 drops below the threshold pressure the diaphragm relaxes to seat on rim 34 and seal the emitter against backflow of and possible concomitant suction of debris into the emitter (FIG. 2F).

In the description and claims of the present application, each of the verbs, "comprise" "include" and "have", and conjugates thereof, are used to indicate that the object or objects of the verb are not necessarily an exhaustive listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. For example, the features of housing insert 60, may be formed in a housing for an emitter in accordance with an embodiment of the invention and the features of housing 22 may be incorporated in an insert. Manifold flow channel 32 and/or feed flow channel 38, which are shown as rectilinear may be curved. The scope of the invention is limited only by the claims.

The invention claimed is:

1. An emitter comprising:
   a plurality of distinct inlet apertures through each of which liquid separately enters the emitter;
   a manifold flow channel in fluid communication with said plurality of inlet apertures, the manifold flow channel arranged such that all liquid passing through the emitter must pass through the manifold flow channel;
   an elastic diaphragm that seats on the manifold flow channel;

first and second parts that sandwich the diaphragm between them, wherein the first part is formed having the manifold flow channel; and an outlet aperture through which liquid that enters the emitter exits the emitter;

wherein:

liquid that enters the inlet apertures displaces only a portion of the diaphragm from the manifold flow channel so that the liquid can leave the manifold flow channel and flow through the emitter to reach the outlet aperture; and a feed flow channel is formed in the first part, wherein:
the feed flow channel is spaced apart from manifold flow channel;
the feed flow channel extends from a region alongside the manifold flow channel to beyond the manifold flow channel;
the feed flow channel receives liquid that exits the manifold flow channel; and
the feed flow channel directs flow of the received liquid in a direction to enter a labyrinth formed in the emitter.

2. An emitter according to claim 1 wherein the diaphragm seats on the labyrinth to constrain liquid to flow through the labyrinth.

3. An emitter according to claim 1 wherein the diaphragm covers a first portion of the feed flow channel leaving a second portion uncovered.

4. An emitter according to claim 3 wherein the received liquid exits the feed flow channel via the second portion of the feed flow channel to enter the labyrinth.

5. An emitter according to claim 4 wherein when the diaphragm is displaced from the manifold flow channel, it is displaced from at least a portion of the first portion of the feed flow channel.

6. An emitter comprising:
a plurality of distinct inlet apertures through each of which liquid separately enters the emitter;
a manifold flow channel in fluid communication with said plurality of inlet apertures, the manifold flow channel arranged such that all liquid passing through the emitter must pass through the manifold flow channel;
an elastic diaphragm that seats on the manifold flow channel;
first and second parts that sandwich the diaphragm between them, wherein the first part is formed having the manifold flow channel; and
an outlet aperture through which liquid that enters the emitter exits the emitter;
wherein:
liquid that enters the inlet apertures displaces only a portion of the diaphragm from the manifold flow channel so that the liquid can leave the manifold flow channel and flow through the emitter to reach the outlet aperture;
the first part is formed having a plurality of protuberances on which the diaphragm rests; and
the protuberances are spaced apart from and surround at least a portion of the manifold flow channel.

7. An emitter according to claim 6 wherein when the diaphragm is displaced from the manifold flow channel some of the liquid that exits the manifold flow channel flows between protuberances to reach the feed flow channel.

8. An emitter according to claim 6 wherein the second part is formed having a labyrinth that receives liquid that has flowed in the manifold flow channel.

9. An emitter according to claim 6 wherein the second part is formed having a reservoir chamber that receives liquid that has flowed through the labyrinth.

10. An emitter comprising:
a first part having formed therein a manifold flow channel rimmed with a raised rim and having first and second regions, the manifold flow channel arranged such that all liquid passing through the emitter must pass through the manifold flow channel;
a second part having formed therein a labyrinth; and
an elastic diaphragm sandwiched between the first and second parts;
wherein, when liquid enters the manifold flow channel;
the liquid is substantially prevented from exiting the manifold flow channel in the first region because the second part presses the diaphragm onto the raised rim in the first region, thereby sealing the manifold flow channel in the first region against egress of liquid; and
the liquid pushes the diaphragm off of the raised rim in the second region, thereby allowing the liquid to flow out of the second region between the raised rim and the diaphragm.

11. The emitter according to claim 10, wherein the second part is formed having a regulation reservoir, and wherein the diaphragm is located between the reservoir and the second region of the manifold flow channel.

12. The emitter according to claim 10 wherein liquid enters the manifold flow channel via a plurality of apertures.

13. An emitter comprising:
a first part comprising:
an external surface and an internal surface;
a plurality of distinct inlet apertures formed in the external surface, each inlet aperture configured to separately permit passage of liquid from the external surface to an interior of the emitter; and
an elongated manifold flow channel formed in the internal surface and in fluid communication with the plurality of inlet apertures, the elongated manifold flow channel being rimmed with a raised rim and having a first region and a second region;
a second part having formed therein a labyrinth communicating with an outlet; and
a diaphragm sandwiched between the first and second parts,
wherein:
when liquid pressure at the external surface of the first part drops below a threshold pressure, the diaphragm is pressed against the raised rim in both the first and second regions to seal the emitter against backflow of liquid into the emitter via the outlet.

14. An emitter according to claim 13 and comprising a regulation reservoir that receives liquid that flows through the labyrinth.

15. An emitter according to claim 14 configured so that displacement of the diaphragm decreases volume of the regulation reservoir.

16. The emitter according to claim 13, wherein:
when liquid enters the manifold flow channel via the plurality of inlet apertures:
the liquid is substantially prevented from exiting the first region of the elongated manifold flow channel because the second part presses the diaphragm onto the raised rim in the first region; and
the liquid pushes the diaphragm off of the raised rim in the second region, thereby allowing the liquid to flow out of the second region between the raised rim and the diaphragm.

* * * * *